United States Patent [19]

Fineo et al.

[11] 4,159,392
[45] Jun. 26, 1979

[54] APPARATUS FOR MOUNTING A PRIMARY ELECTRODE

[75] Inventors: Carlo Fineo, Denver; Robert T. Frese, Jr., Engelwood, both of Colo.; Vladimir Kroupa, Fresno, Calif.

[73] Assignee: Johns-Manville Corporation, Denver, Colo.

[21] Appl. No.: 870,315

[22] Filed: Jan. 18, 1978

[51] Int. Cl.² .............................................. C03B 5/02
[52] U.S. Cl. ............................................. 13/6; 13/25
[58] Field of Search .................... 13/6, 23, 10, 35, 25, 13/14–17; 266/281

[56] References Cited
U.S. PATENT DOCUMENTS

| 2,133,329 | 10/1938 | Moore et al. | 266/281 X |
| 3,909,499 | 9/1975 | Stark | 13/35 |

Primary Examiner—R. N. Envall, Jr.
Attorney, Agent, or Firm—Robert M. Krone; Joseph J. Kelly; William C. Anderson

[57] ABSTRACT

A mounting assembly for a primary electrode in an open-top electric furnace whereby the primary electrode is supported in a working position and for servicing so that it may be readily moved out of the melt and off to a side of the furnace for convenient access. In addition a fixedly mounted clamp firmly securing the primary electrode in its working position and for transmitting electric power to the electrode is provided.

8 Claims, 5 Drawing Figures

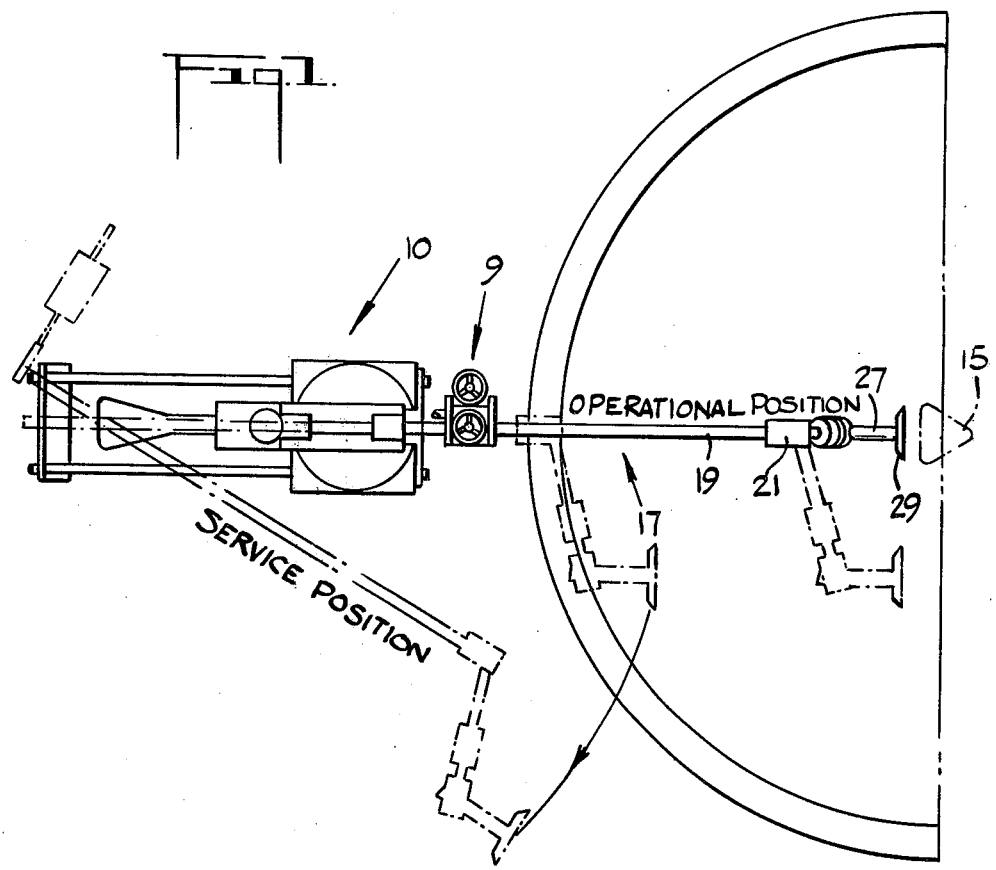
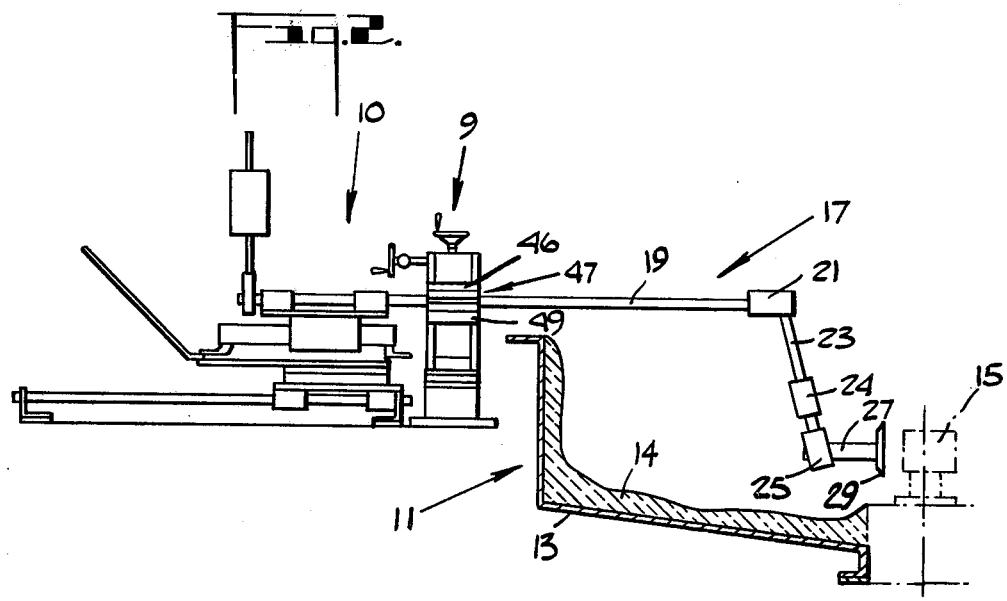

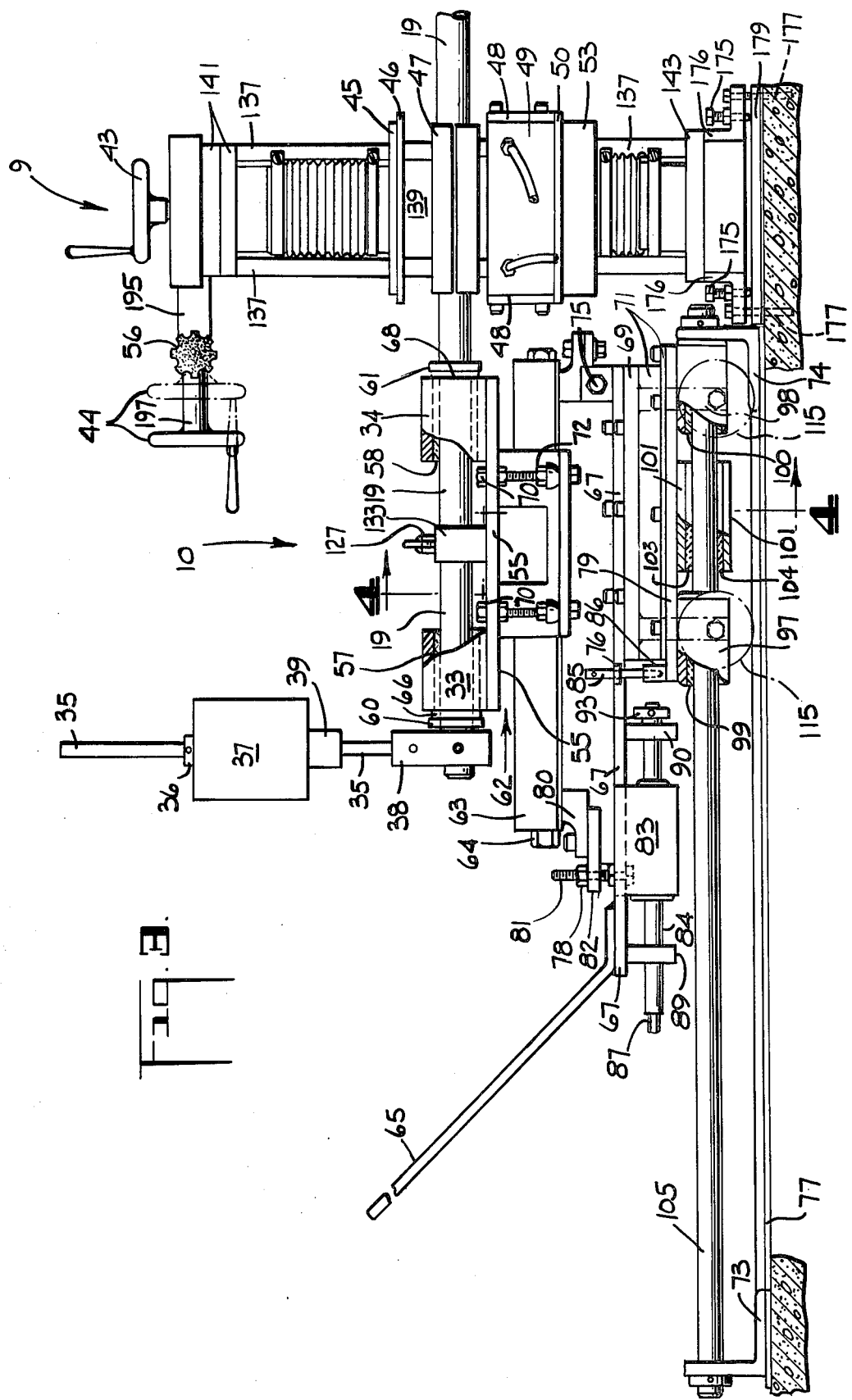

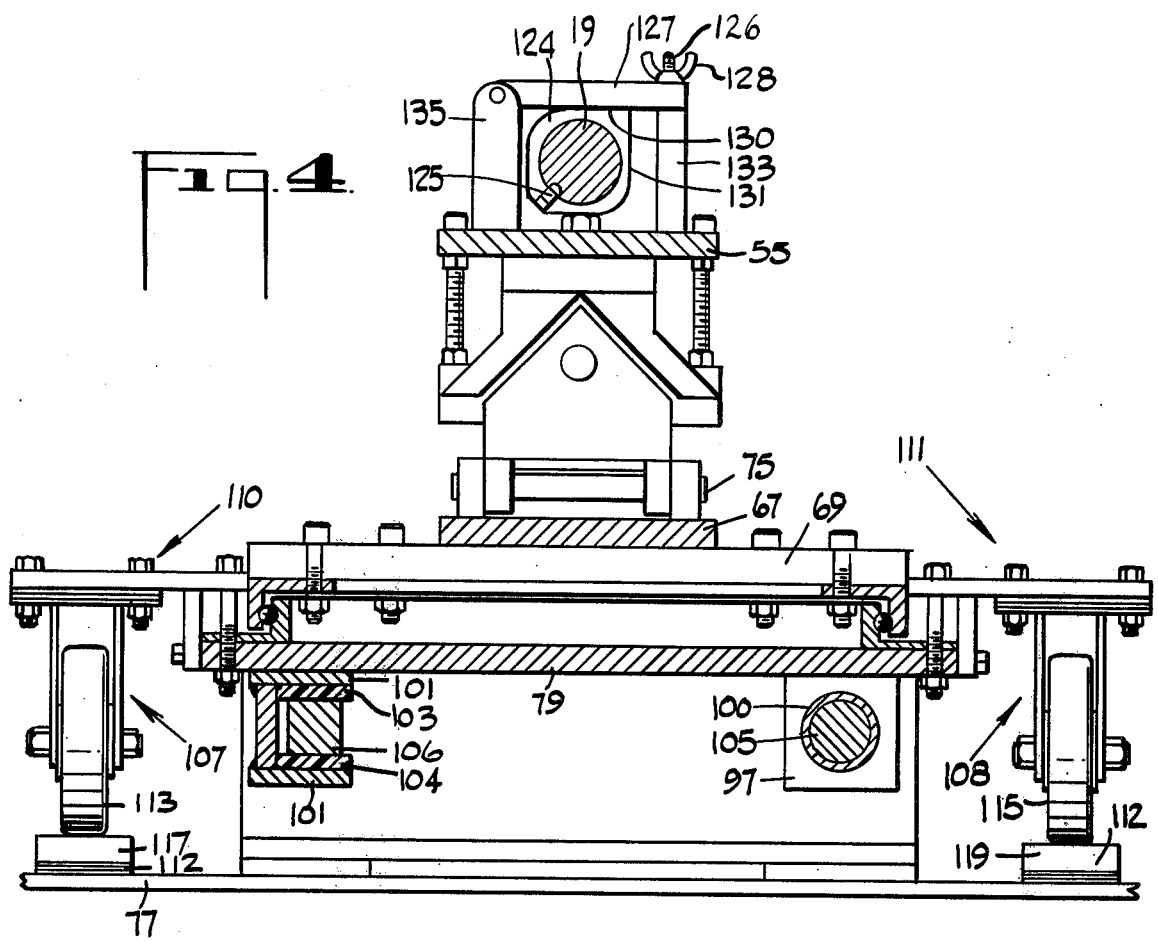

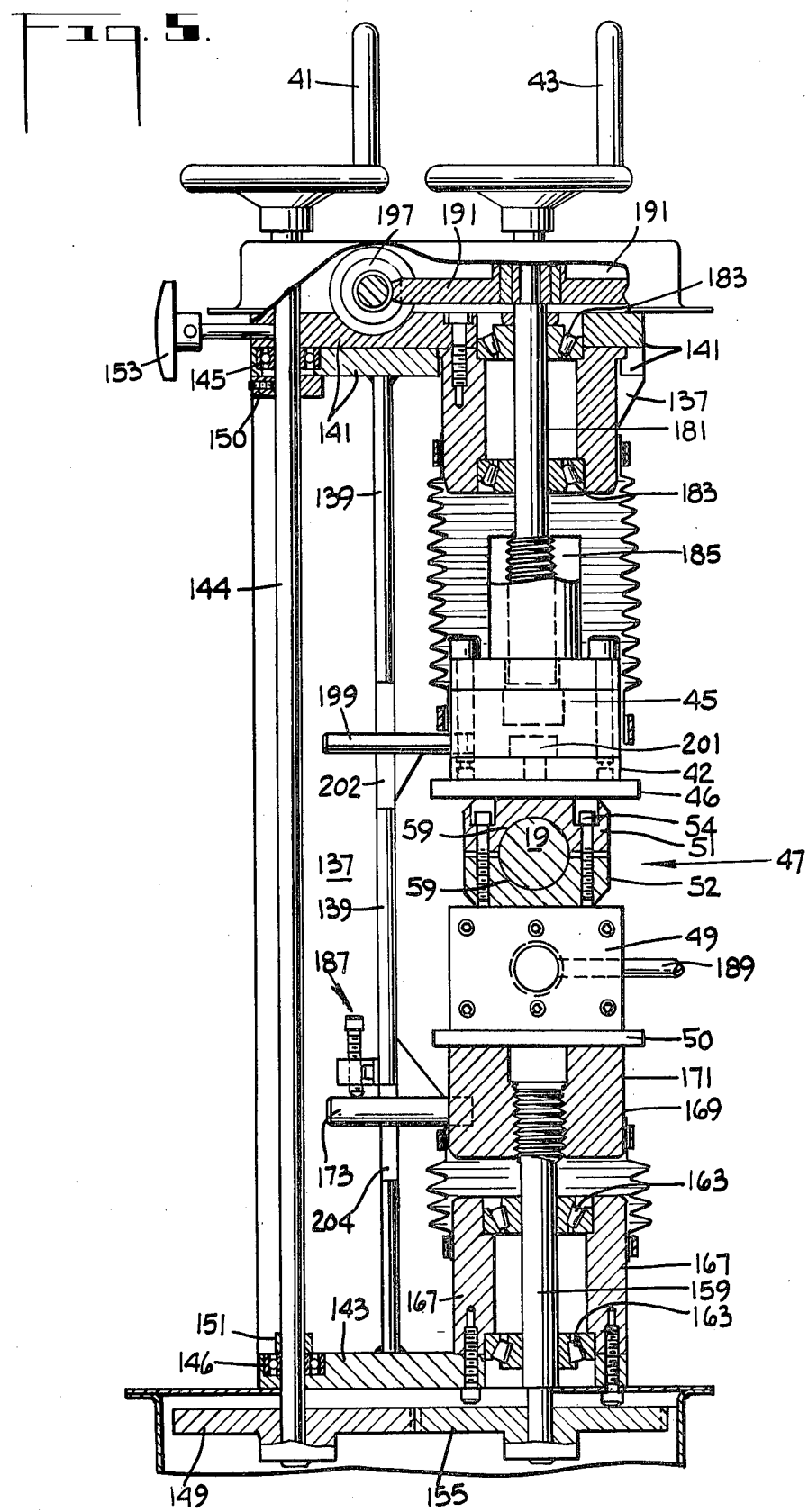

APPARATUS FOR MOUNTING A PRIMARY ELECTRODE

BACKGROUND OF THE INVENTION

This invention pertains to a primary electrode mounting assembly for use with an open-top or roofless electric glass making furnace, and more particularly to a mounting assembly for removable electrodes.

Electrical open-top melting furnaces, having primary electrodes that are shaped and mounted in such a manner that they enter the furnace through the furnace top are known in the art as evidenced by U.S. Pat. No. 3,983,309 and U.S. Pat. No. 2,978,526. It has also been known to use starting, or dipping electrodes which are mounted over an open-top electric furnace as evidenced by U.S. Pat. No. 3,147,328. Generally, these furnaces utilize three electrodes spaced around an outlet member that also acts as an electrical conducting member cooperating with tip plates on the three electrodes to form a three-pointed star current flow pattern.

One of the effects of melting glass by this method is that the electrode tip plates, which usually are made of a refractory metal, such as molybdenum, tantalum, or tungsten, deteriorate with usage. This necessitated the periodic inspection, repair work or replacement of electrode tip plates. This required turning off current flow to the electrodes and the disconnection of power cables from the electrode arms, which operation typically required the presence of a qualified electrician. Next, as is customary with apparatus such as disclosed in U.S. Pat. No. 3,983,309, it was necessary to hoist out the electrode and the electrode mounting assembly, place them off to the side of the furnace, inspect the defective or worn electrode tip plate, replace it with a new tip plate, then hoist the new or repaired primary electrode and electrode mounting assembly back in place, reconnect the power cables and turn the power back on to the repaired electrode. The maneuvering of this typically heavy mass of equipment, which can weigh in the vicinity of 400-500 pounds, in the proximity of an open-top furnace containing a high temperature molten mass, presents a hazard to operators and equipment as well as being a time and manpower consuming operation.

An object of the invention is to provide a mounting assembly for primary electrodes for an open-top furnace, which assembly enables an operator to safely, easily, and quickly remove and/or replace electrodes.

Another object is to provide means for quick and easy connection and disconnection of the primary electrode to and from the electric power.

BRIEF SUMMARY OF THE INVENTION

Accordingly, the present invention provides an open-top furnace for electrically heating molten glass mass in a bath, comprising a circular furnace chamber for containing the bath, an electrically conducting outlet centrally located within the chamber, at least two electrodes each comprising a generally horizontal electrode member extending out over the top of the bath, a generally vertical electrode member connected to the generally horizontal electrode member and extending downwardly into the bath and a second horizontal electrode member connected to the submerged end of the generally vertical electrode member and extending to a point in the bath adjacent the centrally located electrically conducting outlet, the improvement comprising means located outside said chamber for mounting each of said primary electrodes for the pivoting of said horizontal electrode member on its longitutional axis whereby said downwardly extending and second horizontal electrode members are carried from their operational positions to a position above the horizontal plane in which generally lies said first horizontal electrode member; and a carriage holding said mounting means, said carriage being movable in a line radial of said central electrode from an operational position, through a substantial distance relative to the radius of said chamber, to a service position more remote of said chamber, each of said primary electrodes also being mounted for pivoting in said mounting means about a vertical axis through said mounting means whereby, when said carriage is in its service position, the electrode tip is carried in an arc away from said chamber. The invention also includes means, stationarily positioned outside said chamber, for making electric power transmitting engagement with said horizontal electrode member in the operational position of that member and for holding said primary electrode in its operational position, said power distributing and holding means being disengagable.

Preferably, the electric power distributing and electrode holding means comprises a lower, vertically adjustable clamp plate having a horizontal upper surface of electrical insulation and having superimposed thereon an electrically conductive block with upper and lower horizontal surfaces said block being connected to an electric power source, and vertically spaced thereabove an upper vertically adjustable electrode clamp plate having a lower horizontal surface of electrical insulation. There is an electrode contact block secured to an intermediate portion of said first horizontal electrode member and, in the operational configuration of said member, said block has horizontal upper and lower surfaces.

The lower clamp plate is movable upwardly to affect engagement of the upper power block surface with the lower surface of said electrode contact block and said upper clamp plate is downwardly movable for engagement with upper surface of the electrode contact block, said upper and lower clamp plates cooperating to exert considerable compressive force upon the electrode contact block and said electric power block so as to provide excellent electrical contact therebetween and to firmly hold the electrode in position. It is preferred that one end of said horizontal electrode member have secured thereto a lever which extends upwardly and generally vertically in the operational configuration of said primary electrode, said lever having a mass attached thereto for counterweighing the torque exerted by said generally vertically extending electrode member and said second horizontal electrode member when said first horizontal electrode member is pivoted about its longitudinal axis.

BRIEF DESCRIPTION OF THE DRAWINGS

FIG. 1 is a plan view schematically illustrating the primary electrode and mounting assembly of the present invention.

FIG. 2 is a schematic view in side elevation of the embodiment shown in FIG. 1.

FIG. 3 is a side elevational view of mounting and support of the primary electrode according to the invention.

FIG. 4 is a view partially in section taken on the plane passing through the line 4—4 of FIG. 3.

FIG. 5 is an enlarged partial cross-sectional left end view of the clamp assembly of the apparatus of FIG. 3.

DETAILED DESCRIPTION OF THE DRAWINGS

FIGS. 1 and 2 show a circular furnace vessel 11 which has centrally located therein an electrically conducting central outlet 15 about which is disposed three primary electrodes of which one, primary electrode 17, is shown. Primary electrode 17 is supported in its operational position as indicated on FIG. 1 by the electrode clamp assembly 9 and the electrode mount assembly 10 of the invention. Primary electrode 17 is comprised of an electrode tip 29, usually in the form of a plate, to which is pinned a generally horizontal lower electrode rod 27, preferably round in shape, and elbow 25 into which rod 27 is pinned or otherwise connected and also into which a generally vertical electrode rod or arm 23 is connected in a similar manner, an elbow 21 into which the upper end of electrode arm 23 is pinned or otherwise connected and also into which an upper horizontal electrode arm 19 is similarly connected. The primary electrode tip plate 29, horizontal lower electrode arm 27, elbow 25, arms 23 and 19 are preferably made from a refractory metal having good electrical conductivity such as molybdenum, tungsten, tantalum, or alloys thereof. Elbow 21 is preferably made of copper and cooling jacket 24 preferably constructed of stainless steel.

The portion of the horizontal electrode member 19 which passes between the confines of the upper electrical insulation plate 46 and the power block 49 of the electrode clamp assembly 9, which assembly is described in greater detail hereinafter, has an electrical contact plate 47 attached thereto. FIG. 5 shows that the contact plate 47 is comprised of upper and lower halves, 51 and 52, which halves have semi-circular troughs 59 which tightly embrace the cylindrical surface of electrode arm 19 when the two halves are secured to each other as by bolts at 54. The contact plate is preferably made of copper with the electrode contacting surfaces of troughs 59, as well as the bottom face of plate 47, having a thin plating of silver for ensuring that these surfaces are highly conductive and corrosion free. As shown in FIG. 3 the horizontal electrode member 19 is journaled for rotation about its horizontal axis within dielectric bushings 57 and 58 carried in mounting brackets 33 and 34 which are secured to bracket support plate 55. Suitable bushings for electrically isolating the electrode arm from the electrode mount structure include FAFLON bearings. Shaft collars 60 and 61 are attached to the horizontal electrode member 19 to secure it against axial movement within bushings 57 and 58, and insulation washers 66 and 68 electrically isolate the electrode mounting brackets from the steel shafted collars 60 and 61. Secured over the end of electrode arm 19, as shown in FIG. 3, is an eye 38, constructed of a dielectric material. A phenolic material such as RYERTEX is suitable for the dielectric of eye 38 and washers 66 and 68. Into one end of eye 38 is secured a counterweight lever 35, which lever in its operational position is held vertically as in FIG. 3. A sleeve 39 rides the lever 35 and can be locked into position at various points along lever 35. A cylindrical counterweight 37, preferably of lead, is bored to fit over the lever 35 and is held in position on lever 35 by sleeve 39 and shaft collar 36. The mass of the counterweight 37 and its position along lever 35 is so designed to counter-balance the torque exerted about the longitudinal axis of horizontal electrode arm 19 by the electrode tip plate 29 and associated electrode members when the electrode arm 19 is rotated through 90°.

The bracket support plate 55 is bolted by bolts 70 to a conventional DODGE TAKE-UP device 62. By using this device and by rotating the hex nut 64 on the device one way or the other, the DODGE TAKE-UP frame 72 can be moved back and forth over the take-up rail 63, and thus the electrode arm 19 can be adjusted in an axial direction to set the amount of space between electrode tip plate 29 and central outlet 15 to produce the desired melting and operating conditions. The rail 63 of the DODGE TAKE-UP device, at one end, is joined in a pivotal manner about pivot shaft 75 to the take-up mounting plate 67. At the other end of the take-up rail 63 there is a bracket 80 displaced therefrom to which is secured an adjust plate 82. An adjust bolt 81 is bolted through the take-up mounting plate 67 in the inverted manner shown in FIG. 3, and extends upwardly through a hole in the adjust plate 82. There is a tendency for adjust plate 82 to move upwardly, due to the clockwise movement existing about pivot shaft 75. Adjust nut 78 prevents this movement and can be turned one way or the other to finely align the electrode arm 19 with a horizontal plane. Handle 65 is joined to an end portion of take-up mounting plate 67 by bolts, or by welding as shown in FIG. 3. The take-up mounting plate 67 is bolted to a circular bearing plate 69, composed of a dielectric material such as RYERTEX-C, which is in turn bolted to the upper portion of turret bearing 71. The lower ring of bearing 71 is in turn bolted to bearing baseplate 79. This construction allows all of the electrode mount assembly above bearing 71 to be rotated about a vertical axis through the center bearing 71. A locating bracket 76, drilled to receive a locking pin 85 is welded to the mounting plate 67. The mounting assembly and electrodes can be located in the proper operational orientation as shown in solid lines in FIG. 1, and in FIG. 3, by inserting the locking pin 85 made of a dielectric material, through bracket 76 and into the locking pin receiving sleeve 86, which sleeve is welded to the bearing baseplate 79.

The weight of the electrode assembly 10 is supported in a mobile fashion on four conventional caster-type phenolic wheels; a pair of wheel assemblies 107 are on one side of the electrode mount and a pair of wheel assemblies 108 are on the other side. As shown in FIG. 4, wheel assemblies 107 and 108 are secured to cantilevered support brackets 110 and 111, which support brackets are in turn bolted to the bearing baseplate 79. Steel runners 117 and 119, which are bolted to the metal floor plate 77, provide flat and firm parallel running surfaces for the steel casters 113 and 115. Thin metal shims 112 are used to ensure leveling of the running surfaces. In order to guide the electrode mount in a straight path of travel (in a radial line emanating from the center of the furnace), a conventional parallel square and round guide track arrangement is provided. This comprises a square track rider 101 welded to the undersurface of the bearing plate 79 at the middle left side of the base plate as viewed in FIG. 4 and a corresponding track 106 of a square cross-sectional configuration, a pair of round track riders 98 and 97 welded to the right side of the lower surface of baseplate 79 and a corresponding round track 105. As shown best in FIG. 3, round track 105 and square track 106 are supported and held horizontally and in parallelism by front and rear track supports 74 and 73 which are securely bolted through leveling shims to the steel floorplate 77. The round guide track 105 is journaled in bushings 100 of dielectric material, such as FAFLON, carried in the round track riders 97 and 98, and the upper and lower surfaces of the square track 106 are slidably engaged by upper and lower wear strips 103 and 104 of low friction material, such as TEFLON, carried in the square track rider 101.

A lead counter-weight 83, shown in FIG. 3, receives a counter-weight adjust shaft 84 therethrough. The adjust shaft, which supports the counter-weight is journaled for rotation and support in support brackets 89 and 90. A threaded portion, not shown, of the adjust shaft 84 meshes with an internal threaded portion of the counter-weight 83 such that rotation of the adjust shaft by turning the flatted shaft end 87 in one direction or the other moves the counter-weight 83 to the right or left as viewed in FIG. 3. The counter-weight 83 is for counter-balancing the effects of the weight of the cantilevered electrode, and its position is adjusted so that the center of gravity of the carried mounting assembly and primary electrode falls midway between the front pair of wheels and the rear pair of wheels.

As shown in FIG. 3, and best in FIG. 4, the portion of electrode arm 19 midway between mounting brackets 33 and 34 has a locking collar 124 of a dielectric material secured thereto by means of a square key 125 which engages key slots in arm 19 and in the locking collar 124. A retaining arm 127 is pivotally mounted in upstanding clevis 135 which is welded to a top surface of the electrode bracket support plate 55. An upstanding retaining post 133 is also welded to support plate 55 and has an upper portion adapted to receive the free end of the retaining arm 127 when arm 127 is in a closed position as shown in FIG. 4. When the electrode is in its operational position as shown in FIGS. 1 and 2, the lower edge of the closed retaining arm 127 is flush with the edge 130 of locking collar 124. The retaining arm 127 may be locked in a closed position by the engagement of wing nut 128 over a threaded portion 126 of the retaining post 133. The electrode arm when rotated 90 degrees about its longitudinal axis to a service position as shown in broken lines in FIG. 1 may similarly be locked when the retaining arm 127 is closed against edge 131 of locking collar 124.

The electrode clamp assembly 9 which is located adjacent the furnace-most side of the electrode mount assembly 10, includes a supporting frame having transversely extending vertical frame members 137, longitudinally extending vertical frame member 139, upper horizontal frame member 141, and lower horizontal frame member 143. Brackets 176 depend from the frame member 143 and have lower flange portions through which jack screws 175 are threaded. The lower ends of jack screws 175 engage a mounting plate 179 to adjustably suport the clamp assembly 9. Bolts 177 anchor the brackets 176 (and the clamp assembly) to the floorplate 77.

Referring to FIG. 5, a first hand wheel 41 is joined to the upper end of long drive shaft 144, which shaft is journaled through bearings 145 carried in the upper horizontal frame member 141 and through bearings 146 in the lower horizontal frame member 143. Upper and lower shaft collars, 150 and 151, secure the long drive shaft 144 against vertical displacement. A spur gear 149 is attached to the lower end of the long drive shaft 144. A locking knob 153 is threaded through a side wall of the upper horizontal frame member 141 such that it may be screwed into locking engagement with a surface of the long drive shaft 144.

An intermediate portion of a short drive shaft 159 is journaled through a set of roller thrust bearings 163 carried in a housing 167 which is bolted to the lower horizontal frame member 143, as shown in FIG. 5. Driven spur gear 155, which meshes with spur gear 149 is secured to the lower end of the short drive shaft 159. A threaded upper portion 169 of the short drive shaft 159 engages the internal threads of torque plate 171 from which extending horizontally is a stabilizing pin 173. Pin 173, which is preferably pressed into and welded to the torque plate 171 passes through a vertically extending slot 204 in the vertical frame member 139. Upwardly vertical movement of the stabilizing pin 173 within the slot, and thus the vertical displacement of torque plate 171, is limited by the adjustable stop screw assembly 187 which is secured to vertical frame member 139. Stabilizing pin 173 also engages the side of the slot 204 to prevent rotation of torque plate 171 when the drive shaft 159 is rotated therein.

A lower insulation plate 50, of a tough dielectric material, such as a phenolic, is located over the top surface of lower torque plate 171. Contacting the upper face of the insulation plate 50 is the copper power block 49. The torque plate 171, lower insulation plate 50 and the power block 49 are fastened together with a suitable epoxy adhesive and with non-metallic fasteners, not shown, to form a vertically moveable clamping unit. As FIG. 3 shows, copper bus bars 48, which connect with a source of electrical power, are secured to the front and rear walls of the power block 49. Copper conduits 189 conduct cooling fluid to and from an interior cavity of the power block. Power block 49 when in its uppermost elevation, engages the lower surface of the contact plate 47 of the electrode arm 19. To ensure a corrosion-free, highly conductive electrical contact surface, the top surface of power block 49 is provided with a thin plating of silver.

At the upper right of the clamp assembly as shown in FIG. 5, is provided a ball screw 181 journaled in thrust roller bearings 183 carried in bearing housing 184 which is secured to the lower surface of upper horizontal frame member 141. The upper end of ball screw 181 terminates in a second hand wheel 43. A worm 191 is secured to that upper portion of ball screw 181 just above the horizontal frame member 141. As best seen in FIG. 3, there is a third hand wheel 44 carried on the end of a worm wheel shaft 197 which is perpendicular to the ball screw 181 and in the same horizontal plane as the worm 191. Worm wheel shaft 197 has a worm wheel (not shown) secured to its other end, and is slidably mounted within shaft housing 195 such that when the wheel 44 is in a forwardmost position (as shown in broken lines in FIG. 3), the worm wheel of shaft 197 meshes with worm 191, and when hand wheel 44 is in a rearwardmost position (as shown in bold in FIG. 3) the worm and worm 191 wheel of shaft 197 are disengaged. A locking knob 56, threaded into the shaft housing 195 may be turned in against shaft 197 to prevent rotation of shaft 197.

As shown in FIG. 5 a lower threaded portion of ball screw 181 is threaded through ball nut 185 which is in turn secured to upper torque plate 45. A stabilizing pin 199 is pressed into and welded to a side of torque plate 45 and extends through the slot at 202 in the wall of vertical frame member 139. The stabilizing pin 199 slidably engages the wall of slot 202 to hold torque plate 45 against rotation when the ball screw 181 is rotated in the ball nut 185. A load cell assembly 201 is embedded in the center of the lower face of the torque plate 45, and a load cell mounting plate 42 is secured to the lower face of the torque plate 45. The load cell is wired to a remote force meter, not shown. An upper insulation plate 46 subtends the lower surface of the load cell mounting plate 42.

In order to locate the electrode mounting assembly 10 in an operational position, that is, in a position as shown in FIGS. 1 and 2 in which the electrode tip 29 is adjacent the center electrode 15, it is first necessary to manipulate the handles of the clamp assembly 9 such that the insulation plate 46 is in its uppermost position and the power block 49 is in its lowermost position as shown in FIG. 3. By clockwise rotation of the first hand wheel 41, locking knob 153 being loosened, the power block 49 is lowered. By loosening locking knob 56 and turning the third hand wheel 44 counter-clockwise the upper insulation plate 46 is raised.

By pushing handle 65 the mounting assembly 10 is moved to its position closest to the furnace. Counterweight lever 35 is brought by hand to a vertical position, which action rotates the horizontal electrode member 19 about its longitudinal axis such that the electrode tip 29 is brought into the vicinity of the center electrode 15. The retaining arm 127 may then be secured against the locking collar 124 to hold horizontal electrode member 19 and the downwardly extending electrode arm 23 in the same vertical plane. With the power supply to bus bars 48 shut off the first hand clamp wheel 41 is rotated in a counter-clockwise direction so that the power block 49 is raised until the stabilizer bar 173 contacts the stop screw assembly 187. Locking knob 153 is then tightened to lock the long drive shaft 144. The second hand wheel 43 is then turned in a counter-clockwise direction until the upper insulation plate 46 engages the electrode contact plate 47. The third hand wheel 44 is then pushed into the worm wheel shaft housing 195, as shown in FIG. 3, until the worm wheel engages the worm 191 as shown in FIG. 5. The third hand wheel 44 is turned clockwise thereby increasing the clamping force on the electrode contact plate 47 until a force of 35,000 lbs. is indicated on the force meter. The considerable compressive forces existing between the power block 49 and the electrode contact plate 47 ensure that an excellent electrical contact exists over the silver plated interfaces of the power block 49 and the electrode contact plate 47; and in addition a firm, solid platform of support is provided for the primary electrode. Engagement of locking knob 56 secures the third hand wheel 44.

Whenever it is necessary to service the electrode, which necessitates the removal of the electrode tip from the confines of the furnace vessel 11, the horizontal electrode arm 19 (and contact plate 47) must be unclamped from the clamping assembly 9. After first switching off the power supply, locking knob 56 is loosened and hand wheel 44 is turned counter-clockwise to loosen the clamping action, brining the clamping force to zero. After hand wheel 44 is pulled back to disengage the worm, hand wheels 41 and 43 are turned clockwise so that upper insulation plate 46 is fully raised and the power block 48 is fully lowered.

The retaining arm 127 is disengaged from the locking collar 124 and the counterweight lever 35 is manually rotated (with relative ease because of balancing) through 90° so as to rotate the downwardly extending electrode arm 23 through 90°, raising the electrode tip 29 out of the bath and into the same horizontal plane as the horizontal electrode arm 19. The retaining arm 127, shown in FIG. 4, is engaged over the locking collar to hold this electrode position. Pulling back on the handle 65 moves the entire electrode mounting assembly 10 away from the furnace vessel 11 to a position furthermost from the furnace vessel 11 as allowed by the guide rails 105 and 106. Balancing of the carried mass upon the steel wheels and low friction guidance ensures that one operator can manipulate the assembly 10 with reasonable effort. The distance the mounting assembly travels approximates the radius of the furnace vessel 11 so that the tip plate 29 is carried to an intermediate position above the vessel edge, as shown in broken lines in FIG. 1. By disengaging the locking pin 85, and by virtue of bearings 71 the electrode tip 29 may be swung in an arc away from the furnace vessel 13 to assume the final service position illustrated in FIG. 1. To return the primary electrode to its operational or melting position involves a procedure which is the inverse of the above described steps.

Using the present invention one or more primary electrodes of a multi-electrode furnace can be replaced without cooling down the furnace or hazardous hoisting out of electrode and electrode mounting assemblies by merely turning off the power to the bus bars, unclamping the electrode from the electrode clamp, rotating the electrode tip out of the melt, rolling the electrode mount assembly away from the furnace and rotating the electrode in an arc away from the furnace, disconnecting the defective or worn electrode or electrode tip and replacing it with a new electrode or electrode tip then rolling the electrode mount to its original position, rotating the primary electrode into its melting position, securing it in that position by engagement with the clamp and finally turning the power back on to the new or repaired primary electrode. With the present invention, this can be accomplished quickly and safely by one operator.

While the invention has been descirbed in rather full detail, it will be understood that various changes and modifications may suggest themselves to one skilled in the art, all falling within the scope of the invention as defined by the subjoined claims.

What is claimed is:

1. In an open-top furnace for electrically heating molten glass mass in a bath, comprising a circular furnace chamber for containing said bath, an electrode centrally located within said chamber, at least two electrically conductive supporting elements that extend radially about a vertical axis through said central electrode, each of said supporting elements having a first, horizontal portion which in operational position is located over said chamber, a second portion joined to an end of said first portion and which in operational position extends downwardly through the upper surface of said bath, and a third, horizontal portion which in operational position is submerged in said bath having one end secured to the lower end of said second portion ad another end having an electrode tip plate secured thereto, said plate spaced from but adjacent to said central electrode, the improvement comprising:

(a) means located outside said chamber for mounting each of said supporting elements for pivoting of said first, horizontal portion on its longitudinal axis whereby said second and third portions are carried from their operational positions to a position above the horizontal plane in which said first, horizontal portion generally lies; and (b) a carriage holding said mounting means, said carriage being movable in a line radial of said central electrode from an operational positon to a service position more remote of said chamber, each of said supporting elements being mounted for rotation in said mounting means about a vertical axis through said mounting means whereby, when said carriage is in its service position, the electrode tip plate is carried to a position to a side of and remote of said chamber.

2. Apparatus according to claim 1 further including a fixedly mounted electric power distributing means positioned outside said chamber for making power trasmitting engagement with said first, horizontal portion of each supporting element in the operational position of said first, horizontal portion and for holding each supporting element in its operational position, said power distributing and element holding means being disengagable from each of said supporting elements.

3. Apparatus according to claim 2 wherein an electrical contact plate is disposed about an intermediate portion of said first, horizontal portion, said electrical contact plate having generally flat upper and lower surfaces, said power distributing and element holding means includes a vertically adjustable upper clamp plate having a generally horizontal lower surface and a vertically adjustable lower clamp plate having a generally horizontal upper surface, said electrical contact plate being disposed between said clamp plates when in its operational position, and said clamp plates cooperating to forcefully engage said flat upper and lower surfaces of said electrical contact plate.

4. Apparatus according to claim 3 wherein one of said clamp plates is electrically conductive and connected to an electric power source.

5. Apparatus according to claim 4 including means for electrically isolating said supporting elements and said one clamp plate from the remainder of the apparatus structure.

6. Apparatus according to claim 1 wherein said first, horizontal portion of said supporting element has a weighted lever depending therefrom for counter balancing the moment exerted about the longitudinal axis of said first, horizontal portion when the second and third portions are rotated from their operational positions.

7. Apparatus according to claim 1 wherein said carriage is mounted upon wheels and including means for guiding and holding said carriage against all movement but movement in said linear path.

8. Apparatus according to claim 7 including means for adjusting the weight distribution of said mounting means and each of said supporting elements so that the center of gravity falls centrally between said carriage wheels.

* * * * *